July 25, 1950  B. ALTMAN ET AL  2,516,502
THERMOSTATIC ELECTRICAL SWITCH
Filed Oct. 17, 1949
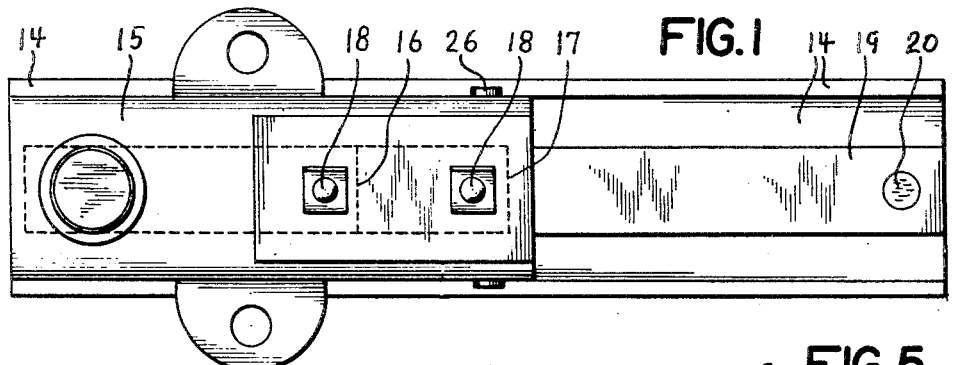
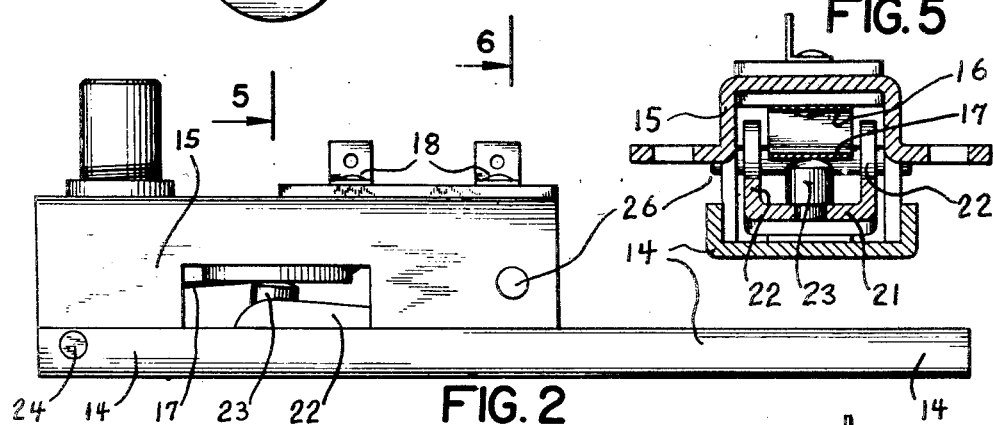
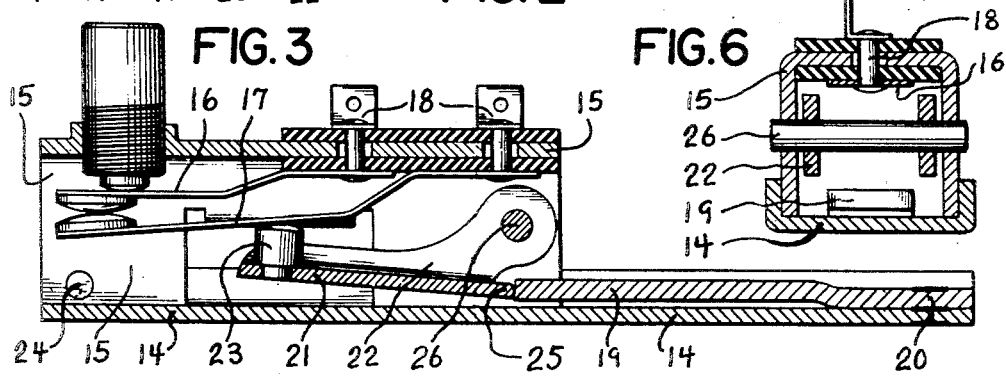
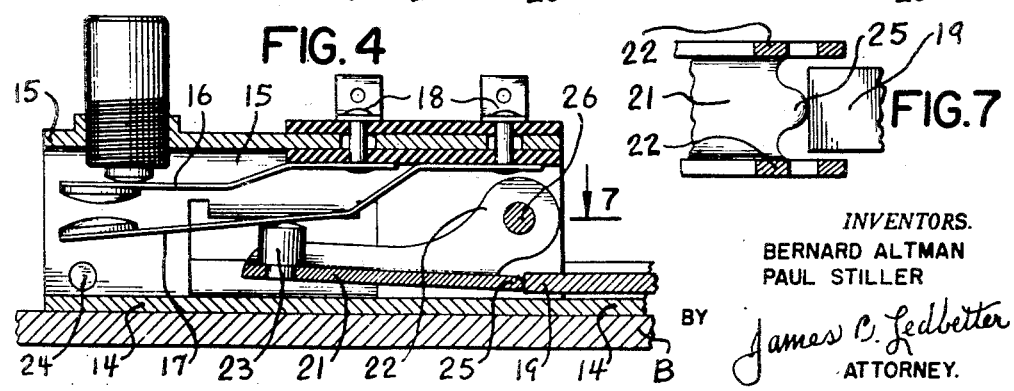
INVENTORS.
BERNARD ALTMAN
PAUL STILLER
BY James C. Ledbetter
ATTORNEY.

Patented July 25, 1950

2,516,502

UNITED STATES PATENT OFFICE 2,516,502

THERMOSTATIC ELECTRICAL SWITCH

Bernard Altman, Larchmont, and Paul Stiller, Mount Vernon, N. Y., assignors to Manrein Corp., New York, N. Y., a corporation of New York Application October 17, 1949, Serial No. 121,726

4 Claims. (Cl. 200—137)

This invention relates to a new thermostatic electrical switch for automatically maintaining substantially constant uniformity of temperatures in electrically-heated apparatus, as for example, by controlling the periodic flow of current to sadirons, furnaces, appliances, and the like, as well as for operating electrical relays employed for various purposes.

The present application is a continuation-in-part of our earlier application filed September 27, 1947, under Ser. No. 776,590, which contains claims generic to both cases. On the other hand, the claims herein are made to the present improvements.

This thermostatic switch includes a metallic member, having a higher coefficient of expansion than other metallic parts of the switch assembly, which elongates when heated and shortens when cooled (as is known in the art), thereby producing an appreciable amount of straight or rectilinear movement which is utilized automatically for opening and closing electrical contacts, thus feeding current by periodic flow to electrical heating elements measured and controlled by the temperature of the latter, and maintaining the temperature thereof at a preselected constant value in accordance with a conventional manual adjustment or setting of the thermostatic switch.

The thermostatic switch herein embodies a metallic bar having a high coefficient of expansion and hence is thermally active or responsive (by linear creeping motion, that is, by elongation and contraction) to temperature variations, for producing an appreciable motion required to actuate (open and close) electrical contacts for stopping and starting the flow of current. We sometimes refer to this form of bar as a "monometal" or a "monobar," also known as a "unimetal" bar, inasmuch as it comprises a single bar of like metallic constituency or formula throughout its mass.

Accordingly, the "monobar" or "unimetal" type of thermally responsive member is distinguished from a "bimetal" thermal responsive bar since the latter comprises a lamination of two metals (of unlike metallic constituency) having dissimilar coefficients of expansion and which produces an angular motion, such as a bowing or flexing action. In other words, the "unimetal" thermostatic bar can be made to act with a straight line movement, while the "bimetal" thermostatic bar always acts with a flexing or angular movement, both types being known in the art.

The monobar or unimetal type of thermally responsive metallic bar is employed herein so as to avail of the advantages in its straight form, its dependable linear movement, its adaptability as a "thermal conduction" member having constant surface-area engagement throughout its range of creeping movement with the heated appliance which it controls, as well as its adaptability to fit and reach into the small or cramped space of electrically heated apparatus. For these and other advantages known to the art, a straight bar type of thermal member is employed herein as the expansion member for controlling this new switch.

In some types of electrical smoothing and laundry irons, as well as other appliances, it is desirable to provide a housing enclosing the switch contacts operated by a thermal bar which reaches from the housing into a heated area where the temperature is most pronounced, that is, of maximum intensity, but where there is lack of space in such area to mount the housing. Likewise, it is desirable to mount the housing with its contacts in an accessible position for conveniently making electrical connections, calibrations, repairs, replacements, etc., while not detracting from the critical position of the thermal bar in the thermally active or hot area of the appliance.

Thus it is seen that a purpose of the invention is to produce a thermally controlled mechanism which automatically actuates electrical switch contacts, the parts in the combined assembly of which are arranged in a new sequence and setting suited to the accomplishment of the requirements outlined in the foregoing paragraph.

The accompanying drawings with description and claims explain the invention as preferred and embodied at this time for an understanding of the problems sought to be solved. Since the teachings herein may suggest structural changes to others who wish to avail themselves of the benefits of the invention, it is pointed out that subsequent modifications hereof may well be the same in spirit and principle as this disclosure.

In the drawings herewith, the left-hand side of each illustration is regarded (for convenience of description) as being the outer or "front" end, while the right-hand side is the inner or "rear" end of the thermostatic switch.

Likewise, the description is made in respect to the illustrated "position" of the thermostatic switch, that is, horizontal and with the switch contacts above the thermally responsive bar. However, it is to be understood that the automatic switch is operative in any position.

The Official Patent Office drawings are made from production samples of the automatic switch, to a two-and-one-half enlarged scale thereof, and thus show the proportion and arrangement of the parts in the form of the automatic switch, as preferred at this time.

Briefly, as shown by the drawings, the new thermostatic switch herein comprises a housing enclosing electrical contacts which are urged apart by spring tension, the housing being mounted on a long flat channel-like base, the latter extending rearwardly from the inner or rear end of said housing, wherein the base not only forms a bottom for the housing but also constitutes a thermally active member (having a high coefficient of expansion), together with motion amplifying means (having a low coefficient), operatively interconnected between the contacts and the rear or far end of the thermally active member remote from the housed contacts, by which the creeping action (linear contraction and expansion due to temperature variation) of said thermal member opens and closes the switch contacts.

Fig. 1 shows a top or plan view of the thermostatic switch and Fig. 2 a side elevation thereof.

Fig. 3 is a lengthwise center section from end to end of the thermostatic switch showing that its electrical contacts have closed for transmitting current through the switch. In other words, the thermal base has contracted due to a drop in temperature and has closed the switch.

Fig. 4 is a similar section but showing the switch contacts open, with the rear end of the thermal base broken away. The contacts are open and the current flow temporarily interrupted due to rise in temperature.

In Fig. 4, the thermostatic switch is shown mounted on a flat heater base (diagrammatic) representing any one of various types of electrically heated appliances, such as the sole plate of a smoothing iron.

Fig. 5 is a transverse section along the plane of line 5 across all the views, through the housing and the electrical contact members, looking toward the rear end.

Fig. 6 also is a transverse section along the plane of line 6 likewise across all the views looking toward the rear, the section being on a pivot axis of the motion amplifying means.

Fig. 7 is a fragmentary top view of a rounded or oval-shaped pressure-nose engagement provided between the motion amplifying means and the thermally actuated abutment member comprising an effective and apparently the best form of motion transfer between the operating parts. This top view is taken on the plane of line 7 in Fig. 4.

Further reference is made to the drawings for a more detailed description of the new automatic switch, with its thermally operated heat-exchange conduction monobar and related parts (including the pressure-nose feature noted in Fig. 7 description), characterized by a new mode of operation, constituting the invention. These and other features make for the commercial success of the invention and its adoption for use in electrical smoothing irons on the market.

One of the more important elements of the automatic switch comprises a thermally responsive monobar 14 of the shape, form and proportion shown in the drawings. It is made of brass or aluminum or other unimetal bar stock having a higher coefficient of expansion than the other switch parts and is adapted as a base 14 for the switch as a whole.

This thermal base is of elongated form, channel-shaped in cross section, with a straight flat bottom, and has parallel ribs or side flanges along its top side which impart stiffness thereto. It not only forms a rigid base for the automatic switch but also constitutes a heat-exchange conduction member adapted to contract and expand along a rectilinear or straight-line path in its creeping travel responsive to temperature variations.

A housing 15 of iron or steel is made U-shaped in cross section and placed upside down and within the brass or aluminum channel-shaped thermally responsive base 14 and secured thereto. In the present example of the invention, the housing 15 is mounted at the front end of the channel-shaped rigid base. It is observed that the base is longer than the housing and extends rearwardly therefrom a distance predetermined in respect to reaching effectively into a small area or heated space, in an electric smoothing iron or other appliance, where it is not convenient to install the housing 15 with its switch contacts for making electrical connections.

An upper electrical contact 16 and lower contact 17 comprise spring tensioned members (one closely spaced under the other) secured to the upper wall of and within the housing 15 by rivets 18 or other known means. The spring contact members are electrically isolated from each other and from the housing 15 in a conventional manner, by the use of mica sheets or other insulation, as shown.

The two electrical make-and-break spring contact members 17 and 18 are pre-formed in such fashion that when fastened in the housing 15 and the switch is assembled, as shown, they are pre-stressed and tensioned normally to spring apart. Thus, an external force is required to reversely flex the lower spring-loaded contact 17 toward and in engagement with the upper contact 16 in order to close the switch (Fig. 3), whereas each contact normally seeks a position away from the other (Fig. 4) to open the switch.

It is a function of the thermal control mechanism (starting with the base 14) to close the switch contacts 16 and 17 by overcoming the flexure of one and forcing it against the other. Accordingly, the present example of the invention provides for the automatic control of the lower spring contact 17.

As to the upper spring contact, a conventional type of manual adjustment is provided for setting it to maintain a pre-selected temperature. For this purpose, an adjustment screw is mounted through the housing, and the upwardly flexed spring contact 16 bears against the insulating end of the screw. By running the screw inward, the upper spring contact 16 approaches the lower one 17 and thus an increase in temperature is required to open the switch. Conversely, turning the adjustment screw outward, causes the tensioned contact 16 to follow the screw upward (thus away from the lower contact 17), whereby a lower temperature will open the switch.

Also, it is observed that each rivet 18 secures a binding post or wire-connection perforated angle-bracket to the top of the housing in circuit with each tensioned contact 16 and 17. This or other conventional wire-connection means is employed, by which to electrically connect conductors when installing the switch in a circuit.

Coming to the thermal control, it is seen that a straight and stiff flat strip of metal, in the form of an abutment head or bar 19 has its rear end anchored (as by a spot weld at 20) to the far or rear extremity of the base extension 14 reaching rearwardly from the housing 15. This abutment member 19 is made of "Invar" stock or other bar material having a low coefficient of expansion. The abutment strip or bar is approximately the length of the extended base portion 14 reaching rearwardly from the housing 15. This mounts the front end of the abutment 19 just inside of the open rear end of the housing 15. It is seen also that a major portion of the abutment strip 19 is mounted parallel and closely spaced to the upper surface of the channel-shaped base 14.

As a feature related to the rear end spot weld 20, fixedly joining the expansion base 14 and the non-expansion strip 19, it is pointed out that the front end of the short housing 15 is also anchored by spot welding at 24 to the front end of the long thermal base 14. This provides for two widely separated anchorages (spot welds) 20 and 24, one at each end of the high expansion base 14. Therefore, the entire length of the thermally responsive base is active, that is, susceptible to thermal elongation and contraction. Since a sensitive thermostatic switch (one which maintains a steady and close temperature differential) requires adequate length in its expansion bar, it follows that the front end portion of the base 14, which forms a bottom for the housing 15, also contributes to thermal control in the same manner as the extended rear end portion thereof.

A long lever arm consists of a web 21 and spaced apart side flanges 22, the latter providing two parallel spaced apart short lever arms upstanding on the rear end of and at right-angles to the long arm web 21. This forms a bell-crank lever of unique construction as more fully understood when considering the other related parts of the motion amplifying means interconnected between the thermally responsive base 14 and the spring contact 17. Incidentally, the motion amplifying lever and related parts (like the housing 15) are made of iron or steel.

A ceramic button-like insulator 23 is fixed in the front end of the long lever arm 21 for pressure engagement with the lower contact 17. On the other hand, the back end of the long web-like lever 21 is formed with a rear-end edge 25 (see Fig. 7) in the plane of the web. This rear-end edge 25 is disposed horizontally and transversely between the two upstanding parallel short arms. The upper ends of the spaced parallel short arms 22 are provided with bearing holes, as shown—for the reception of a rocker shaft, later described.

Fig. 7 shows the rear-end edge 25 in detail from the top, while Figs. 3 and 4 show it from the side. In effect, the rear-end web-edge 25 constitutes a rounded-nose portion centered on the lengthwise axis of the long lever web 21. The nose 25 simulates the surface of a ball in order to make tangent pressure contact with the front end of the low expansion flat abutment strip 19 heretofore described. Any lack of exactness desired in the parallel relation of the abutment strip 19— spot welded at 20 upon the thermal base 14—is compensated by the unique action of the rear-end rounded pressure-nose 25.

Also, it is seen that the rounded surface of the rear-end nose 25 not only is in the plane of the long lever web 21, but likewise it is vertically radial in the plane of the axis of the bearing holes formed in the two upstanding spaced apart short lever arms 22, and moreover it is in the plane of (alignment with) the abutment strip 19. This exactness in relation of the pressure-engaged parts 25 and 19 provides for a rolling motion between them, prevents change in leverage ratio of the short arms 22 in relation to the long arm 21, and contributes to the permanent uniformity of performance, once the thermostat is calibrated to the requirements of a given heater.

A shaft 26 is mounted in the housing 15, and the two short lever arms 22 are operatively suspended thereon. The long lever arm 21 is movably supported under and against the lower spring contact member 17 and is subjected to the pressure thereof, while the rear-end edge (the rounded nose 25) is contiguous with the flat plane end of the low expansion long abutment strip 19 reaching into the rear end of the housing between the planes of the two spaced arms 22.

To further explain the importance of the unique pressure-nose 25 on the bell-crank lever means, it is pointed out that the two upright spaced short arms (flanges) 22 pivotally balance and characteristically suspend the front end (insulating button) 23 of the long arm under and against the downwardly tensioned or sprung contact member 17 and also the rear-end nose 25 of said long arm web against the creeping abutment free end of the abutment strip 19. Thus, the free end 19 of the abutment is disposed closely to or between the planes of the two short lever arms 22, and the creeping movement thereof is active or effective at and with the rear-end edge 25 of the long lever arm and in the plane of (alignment with) its straight web 21.

Accordingly, the operating forces for actuating the switch are received and transmitted at and through the engaging ends 23 and 25 of the long arm. This new combination provides a mode of operation unique in the art and makes for a closely grouped, minimum space, parallel assembly of the long lever arm engagingly interposed under pressure between the tension operated contact member 17 and the free end of the abutment member 19 on the thermally operated base 14.

The thermostatic control switch is installed with its flat thermal base 14 in good temperature-exchange and conduction engagement on the sole plate B of an electric sadiron or other heating appliance adapted to be controlled; and the two spring contacts 16 and 17 are connected in the circuit leading to resistance-coils (not shown) constituting the heating elements concealed within the appliance.

In operation, the contacts 16 and 17 are normally closed, at ambient temperature, and current initially flows to the heating appliance B. As the temperature rises, the high expansion base 14 elongates from its center outward; it "creeps" and "stretches" on the hot sole plate B. Since the abutment strip 19 has a minimum coefficient of expansion, it remains neutral (thermally inactive), and its abutment end seeks to withdraw or creep away from the rear-end edge-nose 25 of the long lever arm 21.

However, the downward pressure of the automatically-controlled spring contact 17 causes it to follow the downward movement of the end 23 (insulator) of the long lever arm 21. This maintains constant pressure engagement of the nose 25 against the abutment 19. Thus the thermal expansion of the base 14 permits the switch contacts to urge apart (open), and there follows a cooling cycle of the electrically heated appliance B, whereupon the thermal base 14 begins to contract or reversely creep.

The latter action imposes a forward thrust on the rear-end edge-nose 25, which gradually lifts the long arm 21 and spring contact 17 by overcoming its downward tension until the two contacts again engage, thereby feeding another increment of current to the heater B to maintain its working temperature.

This disclosure explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

This invention is presented to fill a need for a new and useful thermostatic electrical switch. Various modifications in construction, mode of operation, use and method, may and often do occur to others, especially so after acquaintance with an invention. Accordingly, it is to be understood that this disclosure is exemplary of the principles herein and embraces equivalent constructions.

What is claimed is:

1. A thermostatic switch comprising a housing of U-shaped cross section enclosing electrical contact members, at least one of which is spring tensioned away from the other contact member; a high expansion elongated channel-shaped straight base forming a bottom for said U-shaped housing, upon and within which the housing is inverted and secured, the base being longer than the housing, and extending from the rear end thereof, thus adapting such base extension to reach into a heated area; a bell-crank lever consisting of a long arm formed of a web and spaced apart side flanges, the flanges providing two parallel spaced apart short arms standing upright on the rear end of the web, and the web having a horizontal rear-end edge in the plane thereof formed transversely of the long arm and between the two spaced short arms; an abutment on the rear portion of the base extension, positioned between the planes of the two spaced short arms, and free for relative creeping movement; and a shaft mounted in the housing, above and parallel with the rear-end edge, on which the spaced short arms are pivotally suspended, thereby operatively balancing the long arm under and with its front end against the spring tensioned contact member, and with its rear-end edge against the abutment, by which the relative creeping movement of said abutment is effective against the long arm in the plane of its web to actuate the switch.

2. A thermostatic switch, as defined in claim 1, wherein the said abutment comprises a low expansion elongated straight flat strip approximately the length of the base extension, the rear end of said abutment strip being anchored upon the top side of and at the rear extremity of the base extension, while the major length of said abutment strip is free of said base extension, and the forward free end of said strip abuts the rear-end edge of the web of the long lever to actuate the switch.

3. A thermostatic switch, as defined in claim 1, wherein the housing is anchored approximately at its front end to the high expansion elongated channel-shaped straight base, while the rear end of said housing rests upon said base but is free thereof; wherein said abutment comprises a low expansion strip mounted upon the base extension, the rear end of said abutment strip being anchored to the rear portion of the base extension, and the front end of the abutment strip reaching forward and engaging the rear-end edge of the long lever; whereby the entire base is thermally active and free to expand and contract throughout its length portion between said two anchorages.

4. A thermostatic switch, as defined in claim 1, wherein a rounded nose is centered on the rear-end edge of the web, and the abutment has a flat area tangent to the rounded nose, by which a freely rolling pressure engagement is established between the nose and the abutment.

BERNARD ALTMAN.
PAUL STILLER.

No references cited.